(12) United States Patent
Ramachandran et al.

(10) Patent No.: US 9,708,547 B2
(45) Date of Patent: Jul. 18, 2017

(54) WATER-BASED FORMULATION OF H2S/MERCAPTAN SCAVENGER FOR FLUIDS IN OILFIELD AND REFINERY APPLICATIONS

(75) Inventors: Sunder Ramachandran, Sugar Land, TX (US); Vladimir Jovancicevic, Richmond, TX (US); Ying H. Tsang, Katy, TX (US); Michael P. Squicciarini, Richmond, TX (US); Philippe Prince, Pearland, TX (US); Jianzhong Yang, Missouri City, TX (US); Kyle C. Cattanach, Sugar Land, TX (US)

(73) Assignee: Baker Hughes Incorporated, Houston, TX (US)

( * ) Notice: Subject to any disclaimer, the term of this patent is extended or adjusted under 35 U.S.C. 154(b) by 1162 days.

(21) Appl. No.: 13/172,370

(22) Filed: Jun. 29, 2011

(65) Prior Publication Data

US 2011/0315921 A1    Dec. 29, 2011

Related U.S. Application Data

(63) Continuation-in-part of application No. 12/250,679, filed on Oct. 14, 2008, now Pat. No. 8,366,914.
(Continued)

(51) Int. Cl.
*C10G 29/26* (2006.01)
*C02F 1/68* (2006.01)
(Continued)

(52) U.S. Cl.
CPC .......... *C10G 29/26* (2013.01); *B01D 53/1493* (2013.01); *B01D 53/48* (2013.01);
(Continued)

(58) Field of Classification Search
CPC  C02F 1/683; C02F 2101/40; C02F 2101/101; C02F 2103/365; C10G 19/04;
(Continued)

(56) References Cited

U.S. PATENT DOCUMENTS

| 2,015,038 | A | 9/1935 | Pevere |
| 2,543,953 | A * | 3/1951 | Backensto .................... 208/204 |

(Continued)

FOREIGN PATENT DOCUMENTS

| JP | 7136239 A | 5/1995 |
| WO | 9729834 A1 | 8/1997 |

(Continued)

OTHER PUBLICATIONS

G.H. Meguerian, "A Kinetic Study of the Oxidation of Mercaptans Catalysed by Hydroquinone and Its Homologs," J. of Amer. Chem. Soc., vol. 77, pp. 5019-5022 (Oct. 5, 1955).
(Continued)

*Primary Examiner* — Prem C Singh
*Assistant Examiner* — Brandi M Doyle
(74) *Attorney, Agent, or Firm* — Mossman, Kumar & Tyler, P.C.

(57) ABSTRACT

Hydrogen sulfide ($H_2S$) and/or mercaptan scavengers are chemicals that remove $H_2S$ and/or mercaptans from gas, oil and water. Water-based formulations may be made and used employing scavenging compounds having the formulae:
(Continued)

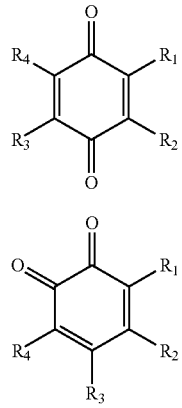

wherein each $R_1$, $R_2$, $R_3$, and $R_4$ are the same or different and are selected from the group consisting of hydrogen, an alkyl, an alkenyl, an aryl, an acyl, a halogen, a hydroxyl, a nitro, an alkyl ester, an aryl ester, an alkyl ether, an aryl ether, a hydroxymethyl, an anhydride group, an amino, and a sulfide. In one non-limiting embodiment the compounds (A) and (B) do not contain nitrogen atoms. Water-based formulations, such as those using a protic solvent with the above compounds, work well as $H_2S$ scavengers.

17 Claims, 2 Drawing Sheets

Related U.S. Application Data

(60) Provisional application No. 61/360,833, filed on Jul. 1, 2010, provisional application No. 60/980,050, filed on Oct. 15, 2007.

(51) Int. Cl.
| | |
|---|---|
| *C10G 19/02* | (2006.01) |
| *C10G 19/04* | (2006.01) |
| *C10G 29/20* | (2006.01) |
| *C10G 29/22* | (2006.01) |
| *B01D 53/48* | (2006.01) |
| *B01D 53/52* | (2006.01) |
| *C02F 101/10* | (2006.01) |
| *C02F 103/36* | (2006.01) |
| *B01D 53/14* | (2006.01) |

(52) U.S. Cl.
CPC .............. *B01D 53/52* (2013.01); *C02F 1/683* (2013.01); *C10G 19/02* (2013.01); *C10G 19/04* (2013.01); *C10G 29/205* (2013.01); *C10G 29/22* (2013.01); *B01D 53/1468* (2013.01); *B01D 53/1487* (2013.01); *B01D 2251/304* (2013.01); *B01D 2251/306* (2013.01); *B01D 2252/103* (2013.01); *B01D 2252/20* (2013.01); *B01D 2252/60* (2013.01); *B01D 2257/304* (2013.01); *B01D 2257/306* (2013.01); *C02F 2101/101* (2013.01); *C02F 2101/40* (2013.01); *C02F 2103/365* (2013.01); *C10G 2300/202* (2013.01); *C10G 2300/207* (2013.01); *C10G 2300/44* (2013.01)

(58) Field of Classification Search
CPC ...... C10G 29/205; C10G 29/22; C10G 29/26; C10G 2300/202; C10G 2300/207; C10G 2300/44; C10G 19/02; B01D 53/1493; B01D 53/48; B01D 53/52; B01D 53/1468; B01D 53/1487; B01D 2251/304; B01D 2251/306; B01D 2252/103; B01D 2252/20; B01D 2252/60; B01D 2257/304; B01D 2257/306
USPC ................ 208/81–84, 189, 208 R, 237, 240, 208/290–291, 298, 311, 313, 322–337, 208/339; 423/220, 226, 242.1, 423/242.2–242.7, 243.01; 210/749, 634, 210/638, 660
See application file for complete search history.

(56) References Cited

U.S. PATENT DOCUMENTS

| | | | | |
|---|---|---|---|---|
| 2,571,666 | A | * | 10/1951 | Bond et al. ............ C10G 27/04 208/204 |
| 2,577,505 | A | | 12/1951 | Barrett |
| 2,583,083 | A | * | 1/1952 | Bond et al. ............ C10G 27/04 423/183 |
| 2,617,713 | A | * | 11/1952 | Ayers et al. ................... 423/183 |
| 2,754,251 | A | * | 7/1956 | Gordon et al. ............... 208/204 |
| 2,819,950 | A | * | 1/1958 | Patton ..................... C01B 17/05 423/576.7 |
| 3,937,795 | A | | 2/1976 | Hasebe |
| 4,016,211 | A | | 4/1977 | Fattori et al. |
| 4,049,776 | A | | 9/1977 | Nicklin et al. |
| 4,325,936 | A | | 4/1982 | Gowdy et al. |
| 4,455,236 | A | | 6/1984 | Kim |
| 4,592,905 | A | | 6/1986 | Plummer et al. |
| 4,927,519 | A | | 5/1990 | Forester |
| 5,180,572 | A | * | 1/1993 | Plummer ................... 423/576.7 |
| 5,223,127 | A | | 6/1993 | Weers et al. |
| 5,698,696 | A | | 12/1997 | Marciniak et al. |
| 5,736,117 | A | | 4/1998 | Plummer et al. |
| 5,980,733 | A | * | 11/1999 | Collins et al. ................ 208/236 |
| 6,309,591 | B1 | | 10/2001 | Yoo et al. |
| 6,309,597 | B1 | * | 10/2001 | Ballinger et al. ............... 422/28 |
| 2004/0152645 | A1 | * | 8/2004 | Cichewicz et al. ............. 514/33 |
| 2009/0036727 | A1 | * | 2/2009 | Kurukchi et al. . B01D 53/1406 585/854 |
| 2009/0095658 | A1 | | 4/2009 | Yang et al. |

FOREIGN PATENT DOCUMENTS

| | | |
|---|---|---|
| WO | 0041975 A1 | 7/2000 |
| WO | 2005097300 A1 | 10/2005 |
| WO | 2007048242 A2 | 5/2007 |
| WO | 2008027721 A1 | 3/2008 |

OTHER PUBLICATIONS

J.A. Perlinger et al., "Addition of Hydrogen Sulfide to Juglone," Eviron.Sci. Technol., vol. 36, No. 12, pp. 2663-2669 (2002).
D. Aebisher et al., "Regioselective (Biomimetic) Synthesis of a Pentasulfane From Ortho-Benzoquinone," J. Org. Chem., 72, pp. 2951-2955 (2007).
M. Uchimiya et al., "Reversible redox chemistryof quinones: Impact on biogeochemical cycles," Chemosphere 77, pp. 451-458 (2009).
Int'l Search Report in EP 11801382.0-1351 dtd Sep. 8, 2015.

* cited by examiner

WATER-BASED FORMULATION OF H2S/MERCAPTAN SCAVENGER FOR FLUIDS IN OILFIELD AND REFINERY APPLICATIONS

CROSS-REFERENCES TO RELATED APPLICATIONS

This application claims the benefit of U.S. Provisional Patent Application Ser. No. 61/360,833 filed Jul. 1, 2010, and is a continuation-in-part application of U.S. Ser. No. 12/250,679 filed Oct. 14, 2008, which issued Feb. 5, 2013 as U.S. Pat. No. 8,366,914,which claims the benefit of U.S. Provisional Patent Application Ser. No. 60/980,050 filed Oct. 15, 2007, all of which are incorporated herein in their entirety by reference.

TECHNICAL FIELD

The present invention relates to methods and compositions for scavenging $H_2S$ and/or mercaptans from fluids, and more particularly relates, in one non-limiting embodiment, to methods and compositions for scavenging $H_2S$ and/or mercaptans from fluids having an aqueous phase, a gaseous phase and/or a hydrocarbon phase using a protic composition comprising a protic solvent and a scavenger compound.

TECHNICAL BACKGROUND

In the drilling, well completion, production, transport, storage, and processing of crude oil and natural gas, including waste water associated with crude oil and gas production, and in the storage of residual fuel oil, $H_2S$ and mercaptans are often encountered. The presence of mercaptans is objectionable because they often react with other hydrocarbons or fuel system components. Another reason that the $H_2S$ and mercaptans are objectionable is that they are often toxic and highly corrosive. $H_2S$ in aqueous environments can adversely affect the integrity of pipelines, separators, storage tanks, etc. by corroding the materials of construction. Even low levels of $H_2S$ in aqueous systems may be toxic to many living organisms. For instance, a trace amount on the order of 100 ppm may be fatal to humans. Still another reason that mercaptans are undesirable is that they have highly noxious odors. The odors resulting from mercaptans are detectable by the human nose at comparatively low concentrations and are well known. For example, mercaptans are used to odorize natural gas and used as a repellant by skunks and other animals.

The predominant $H_2S$ scavengers for natural gas and crude oil are monoethanolamine (MEA) and monomethylamine (MMA) triazines. These triazine compounds, which are amine/aldehyde condensates, contain nitrogen and when used in sufficient concentration can cause problems for certain refineries. Also, the relatively high dosage rates for these triazines, and hence the higher costs, make them less desirable. In addition, there are health, safety and environmental (HS&E) concerns with $H_2S$ scavengers that may contain formaldehyde. There have been instances where operators have required the use of a non-nitrogen containing $H_2S$ scavenger. Glyoxal and/or acrolein have been used as a $H_2S$ scavenger in these instances. Glyoxal is corrosive to mild steel. Acrolein is an extremely toxic substance which operators do not like to use.

Metal oxide (e.g. zinc oxide, ferrous oxide, etc.) solutions and caustic solutions (e.g. sodium hydroxide, potassium hydroxide, etc.) have also been used in the past. However, the metal oxide solutions may generate slurries and solids which have disposal issues, and the caustic solutions may be corrosive.

Hydroquinones are known to be useful as mercaptan scavengers. They are used, for example, with a basic solution to catalyze the oxidation of mercaptans to disulfides to regenerates solvent used for mercaptans exactions from crude oil. Even though hydroquinones have been widely used, their use has not been trouble free. For example, the hydroquinones require both a basic solution, such as caustic, and oxygen to be effective.

U.S. Patent Application Publication No. 2009/0095658 to Yang, et al. (Baker Hughes Incorporated) describes compounds having general formula:

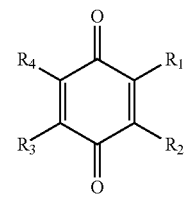

wherein each $R_1$, $R_2$, $R_3$ and $R_4$ are the same or different and may be hydrogen, an alkyl group, an aryl group, a halogen, a nitro group, an alkyl or aryl ester, and an alkyl or aryl ether; and other compounds where one or two of $R_{1-4}$ are quaternary ammonium moieties. These compounds can be used as additives for crude oil and hydrocarbons. These compounds are taught as useful to scavenge mercaptans, sulfides, cyanides, and primary or secondary amines; either alone or in combination. In this Publication, these compounds have been formulated in aprotic solvents such as, but not limited to, aromatic solvents, dichloromethane, chloroform, tetrahydrofuran, N-methylpyrolidone, dimethyl sulfoxide (DMSO), dimethylformamide (DMF) and the like.

It would be desirable if new $H_2S$ and/or mercaptan scavengers were discovered which could be implemented in protic solvents, and which did not necessarily contain nitrogen.

SUMMARY

There is provided in one non-limiting embodiment a method for scavenging hydrogen sulfide and/or mercaptans from a fluid. The fluid may be an aqueous phase, a gaseous phase, a mixture of an aqueous phase and a gaseous phase, a mixture of an aqueous phase and a hydrocarbon phase or a mixture of an aqueous phase, a gaseous phase and a hydrocarbon phase. The method involves contacting the fluid with an effective amount of a protic composition to reduce the amount of hydrogen sulfide and/or mercaptans as compared to an identical method absent the protic composition. The protic composition includes: a protic solvent and a compound having a formula selected from the group consisting of:

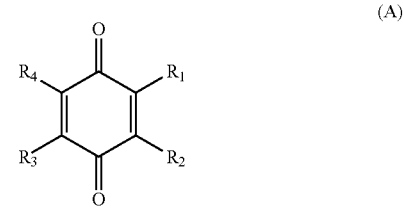

(A)

-continued

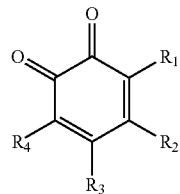
(B)

wherein each $R_1$, $R_2$, $R_3$, and $R_4$ are the same or different and are selected from the group consisting of hydrogen, an alkyl, an alkenyl, an aryl, an acyl, a halogen, a hydroxyl, a nitro, an alkyl ester, an aryl ester, an alkyl ether, an aryl ether, a hydroxymethyl, an anhydride group, an amino, and a sulfide. Alternatively, none of the R groups are nitro or amino.

There is additionally provided in one non-restrictive version, a protic composition for treating fluids containing hydrogen sulfide and/or mercaptans comprising: a protic solvent and a compound having a formula selected from the group consisting of:

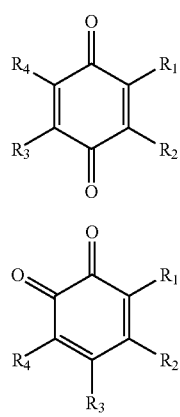

wherein each $R_1$, $R_2$, $R_3$, and $R_4$ are the same or different and are selected from the group consisting of hydrogen, an alkyl, an alkenyl, an aryl, an acyl, a halogen, a hydroxyl, a nitro, an alkyl ester, an aryl ester, an alkyl ether, an aryl ether, a hydroxymethyl, an anhydride group, an amino, and a sulfide. In one non-limiting embodiment, none of the R groups are nitro or amino.

DETAILED DESCRIPTION

Figure 1:
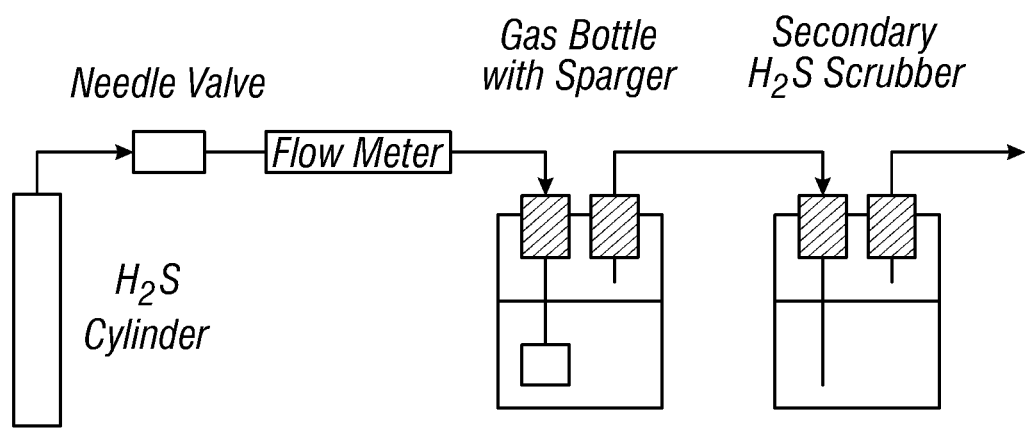
FIG. 1 is a schematic diagram of an uptake test.

It has been discovered that water-based formulations of benzoquinone, specifically para-benzonquinone and ortho-benzoquinone and their derivatives are effective $H_2S$ and/or mercaptan scavengers for many fluids, in particular for fluids having an aqueous phase, but also in other systems. The effective scavenging compounds having the general formulae:

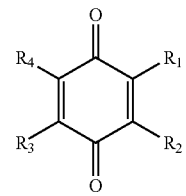
(A)

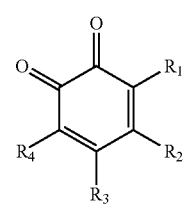
(B)

wherein each $R_1$, $R_2$, $R_3$, and $R_4$ are the same or different and are selected from the group consisting of hydrogen, an alkyl, an alkenyl, an aryl, an acyl, a halogen, a hydroxyl, a nitro, an alkyl ester, an aryl ester, an alkyl ether, an aryl ether, a hydroxymethyl, an anhydride group, an amino, and a sulfide. The number of carbon atoms in the alkyl group, alkenyl group, aryl group, acyl group, alkyl ester group, aryl ester group, alkyl ether group, aryl ether, or anhydride group may range from 1 independently to 10; alternatively from 1 independently to 5. By the term "independently" as used herein with respect to ranges is meant that any lower threshold may be used together with any upper threshold to provide a valid alternative range. By a nitro group is meant $-NO_2$.

In one non-limiting embodiment, $R_n$ is not a nitro group or an amino group to avoid the compound containing nitrogen. It has been surprisingly found that the above mentioned compounds have worked as $H_2S$ scavengers when formulated in protic solvents such as water, methanol and ethanol, and that good results are obtained.

Aqueous solutions of both ortho- and para-quinones (formulae (B) and (A)) may be used to remove $H_2S$ and/or mercaptans from natural gas or oil by a method involving introducing an aqueous solution of the benzoquinone into the gas or oil. In alkaline solutions (defined in one non-limiting embodiment as having a pH above 10), the ortho- and para-quinines, depending upon prevalent redox conditions (i.e. pH) may be present in fully reduced, intermediate or fully oxidized states as shown in formulae (I)-(V) below for para-quinone:

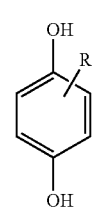
(I)

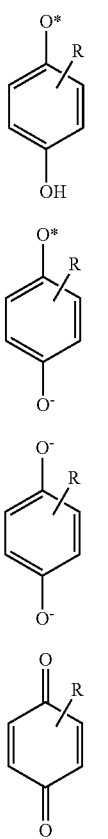

where R is $R_1$, $R_2$, $R_3$ and/or $R_4$ as previously defined. When both fully reduced (I and IV) and oxidized (V) forms of a quinine are present in alkaline solution they can exchange electrons to form semi-quinone radicals (II and III). The semi-quinone and fully oxidized quinone react with hydrogen sulfide to form an addition reaction product via an α-β conjugated system. This reaction product does not contain elemental sulfur whose presence in oil and/or gas systems is considered detrimental to the production system's integrity.

Unlike the addition reaction of $H_2S$ with semi-quinone and fully oxidized quinine in alkaline solutions, the reaction with quinone (V) in non-aqueous solutions (defined in one non-limiting embodiment as a pH of less than 8) occurs with the formation of elemental sulfur. (For instance, see U.S. Pat. Nos. 4,592,905 and 5,180,572 incorporated herein by reference in their entirety.)

In one non-limiting embodiment, the protic solvent may be water; alternatively the protic solvent may be alcohols, glycols and mixtures thereof alone or without water. Suitable alcohols include methanol and ethanol. Other possible solvents can be isopropyl alcohol, n-propanol and n-butanol (n-butyl alcohol). Dimethyl formamide may also be used as an aprotic solvent.

The amount of the component (A) or (B), such as benzoquinone, in the protic composition may range from about 5 to about 40 mass %, alternatively from about 10 independently to about 30 mass %.

In one non-limiting embodiment the protic composition containing the compound has a pH of greater than 9; alternatively the composition has a pH of from about 11 to about 13.

To accomplish the rise in pH, a base may be added. Suitable bases include, but are not necessarily limited to, sodium hydroxide, potassium hydroxyide and combinations thereof. The base is present in a concentration effective to give the composition a pH of greater than 9, in another non-limiting embodiment, a pH of from about 11 to about 13. There is some indication that acceptable results may be achieved with a pH of about 12.

The protic formulations or compositions may also contain a surfactant, which may act as a dispersant. Suitable surfactants that may be used include, but are not necessarily limited to, nonyl phenol ethoxylates.

It has been discovered that water-based formulations of these compounds act as hydrogen sulfide scavengers when the hydrogen sulfide is present in the aqueous phase, the gaseous phase and/or a hydrocarbon phase. The method and compositions described herein may be used to remove $H_2S$ and/or mercaptans from aqueous systems including, but not necessarily limited hydrogen sulfide from, water injection systems, produced water from an oilfield, hydrogen sulfide present in mixed production streams and the like. These methods and compositions may also be used to remove hydrogen sulfide present in natural gas produced from natural gas wells. It is expected that the methods and compositions may be used to remove hydrogen sulfide in crude oil. These methods and compositions may also be used to remove hydrogen sulfide from brines containing hydrogen sulfide. These methods and compositions may provide a non-nitrogen-based $H_2S$ and/or mercaptan scavenger.

The methods described herein may involve scavenging $H_2S$ and/or mercaptans from a fluid including an aqueous phase, a hydrocarbon phase and mixtures thereof. In this embodiment, the compound may be present in the protic or aqueous composition in a concentration from about 50 independently to about 1000 ppm; alternatively from about 50 ppm independently to about 200 ppm.

In one non-limiting embodiment the amount of the protic composition used in the fluid may range from about 50 wt % independently to about 99 wt %, alternatively from about 60 wt % independently to about 85 wt %. Alternatively, the dosage range is from about 10 independently to about 300 ppm of the active compound per ppm of the $H_2S$ and/or the mercaptan; alternatively from about 10 independently to about 20 ppm of the active compound per ppm of the $H_2S$ and/or the mercaptan. In one non-limiting embodiment the method is practiced in a refinery.

When the method scavenges $H_2S$ and/or mercaptans from a gaseous phase, the method may be practiced by contacting the gaseous phase with droplets of the composition, in one non-limiting embodiment a mist, and/or passing the gaseous phase through the composition, such as through a liquid phase of the protic composition, such as by bubbling through a tower. With respect to removing $H_2S$ and/or mercaptans from a gaseous phase, the compound is present in the protic composition in a concentration of at least 50 vol %, alternatively at least 60 vol %, alternatively at least 70 vol %, alternatively at least 80 vol %, alternatively at least 90 vol %, and alternatively at least 95 vol %.

It has also been discovered that compounds having the general formulae (A) and (B) may be effective to scavenge $H_2S$ in gaseous systems, which formulae include benzoquinones ($C_6H_4O_2$) and their derivatives. Particular useful formulations include, but are not necessarily limited to 20 ppm per ppm $H_2S$ of benzoquinone in dimethylformamide and 17 ppm benzoquinone in diglyme. However, these are aprotic solvents.

Figure 3:
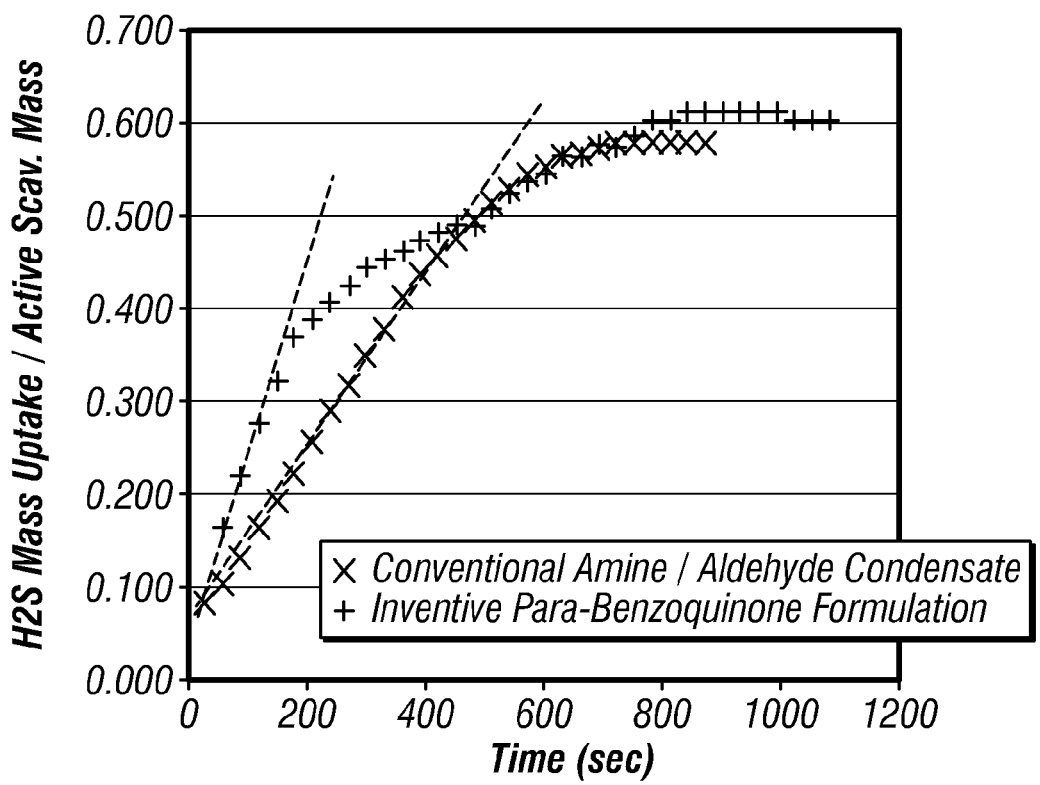
FIG. 3 is a graph showing the initial rate of reaction of the ratio of $H_2S$ mass uptake/active scavenger mass over time comparing a benzoquinone compound of a method described herein with that of a conventional amine/aldehyde condensate.

It has also been discovered that the compositions and methods herein may be used to scavenge H$_2$S and/or mercaptans in gaseous systems. The methods and compositions are found to have higher kinetics than conventional amine/aldehyde condensates. FIG. 3 presents a graph demonstrating that the initial rate of reaction between a compound as described herein (15 wt % para-benzoquinone, 4.5 wt % KOH and 80.5 wt % water) and H$_2$S is about two times faster than that of a conventional amine/aldehyde condensate. In addition, the compositions discussed herein generally provide higher H$_2$S-scavenging capacities than traditional amine/aldehyde condensate.

Because of this fast reaction rate, the methods and compositions described herein have an advantage to scavenge H$_2$S and/or mercaptans where contact time is limited. In one non-restrictive example, on offshore platforms where space is limited, and hence there are short contact times between scavengers and H$_2$S, often operators have to over-inject chemicals in order to reduce H$_2$S levels to acceptable values. However, with the methods and compositions described herein, it is expected that much shorter contact times will be needed to reduce H$_2$S to acceptable levels. As a result, operators do not have to build and use extra long flow loops in order to provide the extra distance (and extra contact time) that is necessary to scavenge H$_2$S before sales points.

Further details about the compounds and their methods of use may be found with reference to U.S. Patent Application Publication No. 2009/0095658 incorporated herein in its entirety by reference.

The invention will now be illustrated with respect to certain examples which are not intended to limit the invention in any way but simply to further illustrate it in certain specific embodiments.

EXAMPLE 1

A formulation that contains 15% para-benzoquinone, 4.5 potassium hydroxide, and 80.5% water was made. These amounts are mass %. Uptake tests were conducted with this formulation. A schematic diagram of the uptake test is shown in FIG. 1. This test was also used to generate the data of FIG. 3. The pH of this formulation was about 10.

Figure 2:
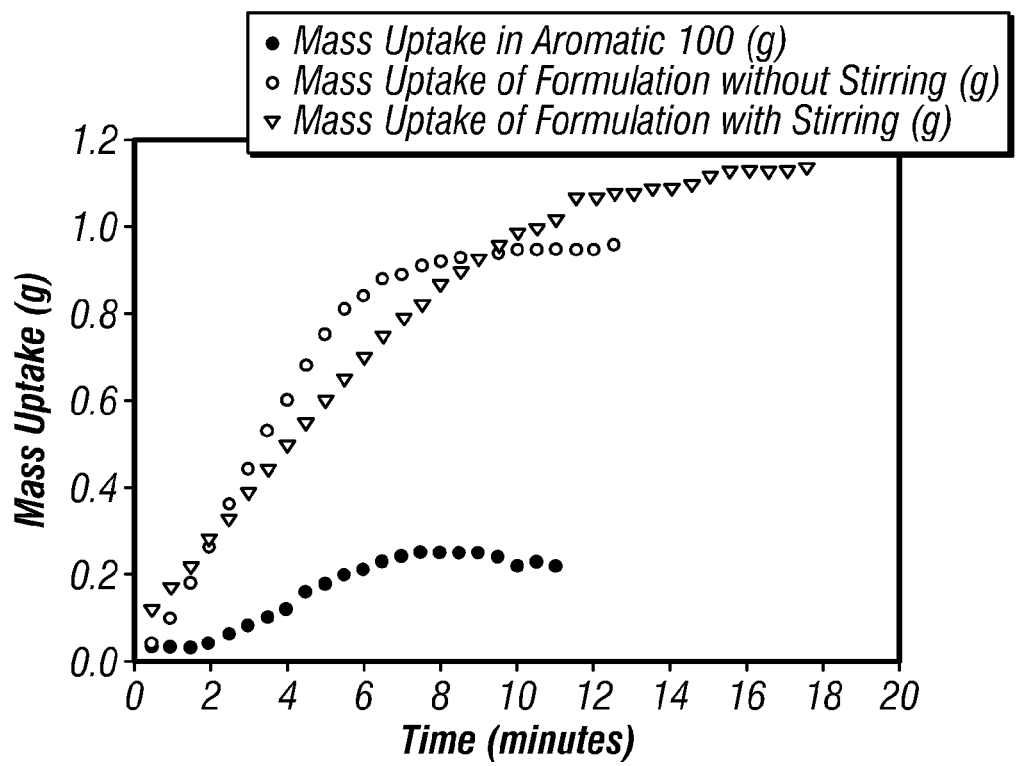
FIG. 2 is a graph showing the results of a $H_2S$ uptake test showing mass uptake as a function of time.

The liquid used in the tests was Aromatic 100. Aromatic 100 is a commonly used liquid solvent identified with CAS 64742-95-6. In the tests conducted using the protic solvent based formulation, 5.05 gms of the formulation were put into 44.96 gm of Aromatic 100. The results are shown in FIG. 2.

It can be seen that tests with just Aromatic 100 resulted in a mass uptake of only about 0.25 gm whereas the tests with the formulation in Aromatic 100 resulted in a mass gain of about 0.96 gm with the formulation in aromatic 100 when it was not stirred and a mass gain of about 1.14 g for the formulation in aromatic 100 that was stirred. The formulation did contain 0.228 gms of potassium hydroxide. In order to form potassium sulfide, this would react with 0.07 gms of hydrogen sulfide. Here mass gains of 0.64 gm of hydrogen sulfide were obtained for the unstirred case and 0.82 gm of hydrogen sulfide was obtained for the stirred case which can only be the result of the protic solvent based formulation.

In the foregoing specification, the invention has been described with reference to specific embodiments thereof, and has been demonstrated as effective in providing methods and compositions for scavenging H$_2$S and/or mercaptans from aqueous fluids, hydrocarbon fluids, gaseous phases and combinations thereof. However, it will be evident that various modifications and changes can be made thereto without departing from the broader spirit or scope of the invention as set forth in the appended claims. Accordingly, the specification is to be regarded in an illustrative rather than a restrictive sense. For example, specific protic solvents and hydroquinone compounds and derivatives thereof falling within the claimed parameters, but not specifically identified or tried in a particular composition or method, are expected to be within the scope of this invention.

The words "comprising" and "comprises" as used throughout the claims is interpreted "including but not limited to".

The present invention may suitably comprise, consist or consist essentially of the elements disclosed and may be practiced in the absence of an element not disclosed. For instance, the protic composition may consist of or consist essentially of the protic solvent and the compound of formulae (A) and (B) as the solvent and compound are defined in the claims. In another non-limiting instance, the method for scavenging hydrogen sulfide and/or mercaptans from a fluid including, but not necessarily limited to, an aqueous phase, a gaseous phase, a mixture of an aqueous phase and a gaseous phase, a mixture of an aqueous phase and a hydrocarbon phase and a mixture of an aqueous phase, a gaseous phase and a hydrocarbon phase may consist of or consist essentially of contacting the fluid with an effective amount of a protic composition to reduce the amount of hydrogen sulfide and/or mercaptans as compared to an identical method absent the protic composition, where the protic composition consists of or consists essentially of a protic solvent and a compound having a formula (A) and/or (B) as described in the claims.

What is claimed is:

1. A method for scavenging hydrogen sulfide from a fluid comprising: contacting the fluid with an effective amount of a protic composition to reduce the amount of hydrogen sulfide as compared to an identical method absent the protic composition, the protic composition consisting of:
   a protic solvent;
   optionally a base selected from the group consisting of sodium hydroxide, potassium hydroxide and combinations thereof; and
   a non-nitrogen-based compound having a formula selected from the group consisting of:

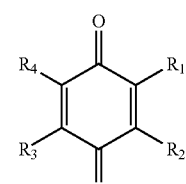

(A)

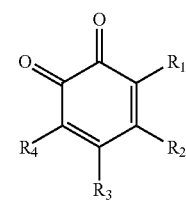

(B)

wherein each R$_1$, R$_2$, R$_3$, and R$_4$ are the same or different and are selected from the group consisting of hydrogen, an alkyl, an alkenyl, an aryl, an acyl, a halogen, a hydroxyl, an alkyl ester, an aryl ester, an alkyl ether, an aryl ether, a hydroxymethyl, an anhydride, and a sulfide, and where the fluid is selected from the group consisting of:
    an aqueous phase,
    a gaseous phase,
    a mixture of an aqueous phase and a gaseous phase,
    a mixture of an aqueous phase and a hydrocarbon phase, and
    a mixture of an aqueous phase, a gaseous phase and a hydrocarbon phase.

2. The method of claim 1 where the protic composition has a pH of greater than 9.

3. The method of claim 1 where the protic composition has a pH of from about 11 to about 13.

4. The method of claim 1 where the base is present at a concentration effective to give the composition a pH of greater than 9.

5. The method of claim 1 where the method scavenges $H_2S$ from a fluid selected from the group consisting of an aqueous phase and mixtures of an aqueous phase and a hydrocarbon phase and the compound is present in the protic composition at a concentration of from about 50 to about 1000 ppm by mass.

6. The method of claim 5 where the method is practiced in a refinery.

7. The method of claim 1 where the method scavenges $H_2S$ from a gaseous phase and the method is practiced by a process selected from the group consisting of:
    contacting the gaseous phase with droplets of the protic composition; and
    passing the gaseous phase through the protic composition, where the compound is present in the protic composition in a concentration of at least 50 vol%.

8. A method for scavenging hydrogen sulfide from a fluid comprising: contacting the fluid with from about 50 weight % to about 99 weight % of a protic composition to reduce the amount of hydrogen sulfide therein, the protic composition consisting of:
    a protic solvent;
    optionally a base selected from the group consisting of sodium hydroxide, potassium hydroxide and combinations thereof; and
    a non-nitrogen-based compound having a formula selected from the group consisting of:

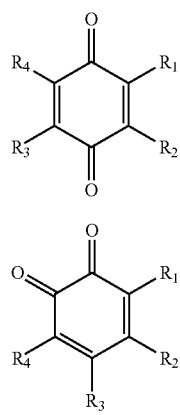

(A)

(B)

wherein each $R_1$, $R_2$, $R_3$, and $R_4$ are the same or different and are selected from the group consisting of hydrogen, an alkyl, an alkenyl, an aryl, an acyl, a halogen, a hydroxyl, an alkyl ester, an aryl ester, an alkyl ether, an aryl ether, a hydroxym-ethyl, an anhydride, and a sulfide where the protic composition has a pH of greater than 9 and the protic composition contains at least about 50 ppm by mass of the compound, and where the fluid is selected from the group consisting of:
    an aqueous phase,
    a gaseous phase,
    a mixture of an aqueous phase and a gaseous phase,
    a mixture of an aqueous phase and a hydrocarbon phase, and
    a mixture of an aqueous phase, a gaseous phase and a hydrocarbon phase.

9. The method of claim 8 where the composition has a pH of from about 11 to about 13.

10. The method of claim 8 where the base is present at a concentration effective to give the composition a pH of greater than 9.

11. The method of claim 8 where the method scavenges $H_2S$ from a fluid selected from the group consisting of an aqueous phase and mixtures of an aqueous phase and a hydrocarbon phase.

12. The method of claim 11 where the method is practiced in a refinery.

13. The method of claim 8 where the method scavenges $H_2S$ from a gaseous phase and the method is practiced by a process selected from the group consisting of:
    contacting the gaseous phase with droplets of the protic composition; and
    passing the gaseous phase through the protic composition, where the compound is present in the protic composition in a concentration of at least 50 vol %.

14. A method for scavenging hydrogen sulfide from a fluid consisting of: contacting the fluid with from about 50 weight % to about 99 weight % of a protic composition to reduce the amount of hydrogen sulfide therein, the protic composition consisting of:
    a protic solvent;
    a base selected from the group consisting of sodium hydroxide, potassium hydroxide and combinations thereof; and
    a non-nitrogen-based compound having a formula selected from the group consisting of:

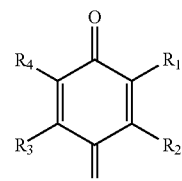

(A)

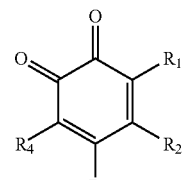

(B)

wherein each $R_1$, $R_2$, $R_3$, and $R_4$ are the same or different and are selected from the group consisting of hydrogen, an alkyl, an alkenyl, an aryl, an acyl, a halogen, a hydroxyl, an alkyl ester, an aryl ester, an alkyl ether, an aryl ether, a hydroxym-ethyl, an anhydride, and a sulfide where the protic composition has a pH of from about 11 to about 13 and the protic composition contains at least about 50 ppm by mass of the compound, and where the fluid is selected from the group consisting of:
- an aqueous phase,
- a gaseous phase,
- a mixture of an aqueous phase and a gaseous phase,
- a mixture of an aqueous phase and a hydrocarbon phase, and
- a mixture of an aqueous phase, a gaseous phase and a hydrocarbon phase.

15. The method of claim 14 where the method scavenges $H_2S$ from a fluid selected from the group consisting of an aqueous phase and mixtures of an aqueous phase and a hydrocarbon phase.

16. The method of claim 15 where the method is practiced in a refinery.

17. The method of claim 14 where the method scavenges $H_2S$ from a gaseous phase and the method is practiced by a process selected from the group consisting of:
- contacting the gaseous phase with droplets of the protic composition; and
- passing the gaseous phase through the protic composition, where the compound is present in the protic composition in a concentration of at least 50 vol %.

\* \* \* \* \*